United States Patent [19]

Cyr et al.

[11] Patent Number: 4,767,675

[45] Date of Patent: Aug. 30, 1988

[54] ORIENTED OPAQUE FILMS CONTAINING ALKENYLAROMATIC POLYMERS

[76] Inventors: Patricia A. Cyr, 5797 Clovermeadow Dr., Farmington, N.Y. 14425; John R. Wagner, Jr., 300 Ashley Dr., Rochester, N.Y. 14620

[21] Appl. No.: 933,497

[22] Filed: Nov. 21, 1986

[51] Int. Cl.$^4$ .............................................. C08L 23/04
[52] U.S. Cl. ................................... 428/515; 428/327; 428/910; 525/240; 525/241
[58] Field of Search ............ 428/327, 332, 910, 475.5, 428/474.4, 515; 525/240, 241

[56] References Cited

U.S. PATENT DOCUMENTS

| | | | |
|---|---|---|---|
| 3,932,332 | 1/1976 | Douglas et al. | 525/241 |
| 4,007,141 | 2/1977 | Wismer et al. | 427/373 |
| 4,539,371 | 9/1985 | Gunesin | 525/240 |
| 4,579,912 | 4/1986 | Canterino et al. | 525/88 |
| 4,582,736 | 4/1986 | Duncan | 428/315.5 |
| 4,582,752 | 4/1986 | Duncan | 428/315.5 |
| 4,632,869 | 12/1986 | Park et al. | 428/315.5 |
| 4,634,735 | 1/1987 | Thiersault et al. | 525/240 |
| 4,652,489 | 3/1987 | Crass et al. | 428/910 |
| 4,663,219 | 5/1987 | Janocha et al. | 428/346 |
| 4,673,711 | 6/1987 | Sharps, Jr. et al. | 525/240 |

Primary Examiner—Edith Buffalow

[57] ABSTRACT

Opaque oriented polyolefinic films, e.g., polypropylene, containing dispersed alkenylaromatic polymers, such as polyalphamethylstyrene as cavitating agent.

9 Claims, No Drawings

ORIENTED OPAQUE FILMS CONTAINING ALKENYLAROMATIC POLYMERS

CROSS-REFERENCE TO RELATED APPLICATIONS

Ser. No. 686,808 entitled "Opaque Pearlescent Films Containing Blends of Polymers for Improved Dispersion of Incompatible Polymer Phase", now U.S. Pat. No. 4,615,942. Ser. No. 686,809 entitled "Opaque Pearlescent Films Containing Dispersed Incompatible Polymer and Polymeric Interfacial Agent", now U.S. Pat. No. 4,615,941.

BACKGROUND OF THE INVENTION

Opaque polymeric films in which the opacifying agent is finely divided polymer dispersed in the continuous film polymer phase are described in U.S. Pat. No. 4,377,616, which is incorporated herein by reference in its entirety. In the patent the film is prepared by melting a mixture of a major proportion of a film forming polymer such as polypropylene and a minor proportion of an incompatible polymer which has a higher melting point, such as nylon (polybutyleneterephthalate is also known to be useful), at a temperature sufficient to melt the incompatible polymer and to disperse it in the film forming polymer, extruding the mixture into a film and biaxially orienting the film. The dispersed incompatible polymer provides sites for the formation of voids surrounding the dispersed polymer particles when the film is oriented. These voids provide opacity and give the film an attractive pearlescent sheen.

U.S. Pat. No. 4,579,912 discloses blends of linear, low density copolymers and up to 10% aromatic polymers, e.g., polyparamethylstyrene, as a means of providing blown films having greater MD strength and higher stiffness compared to film containing the low density copolymers alone.

The instant invention is concerned with films having a high degree of or improved opacity.

SUMMARY OF THE INVENTION

This invention is directed to the use of aromatic polymers in opaque thermoplastic films. This invention is more particularly directed to the use of aromatic polymers as cavitating agents in such films. A particular aspect of the invention is therefore directed to an opaque biaxially oriented melt extruded film comprising a continuous phase of a first polymer and a discontinuous dispersed phase of a finely divided deformable second polymer incompatible with said first polymer and dispersed therein in a minor cavitating amount.

DETAILED DESCRIPTION OF THE INVENTION

Various polyolefins are suitable for use in the invention as the film forming polymer. Preferred are $C_2$ to about $C_8$ olefins. Most preferred is polypropylene.

It is essential that second polymer of the blend be incompatible with the first polymer, e.g., polypropylene, and intimately dispersed therein in minor amounts. In the preferred combination polypropylene is the film forming polymer and an aromatic polymer, preferably polyalphamethylstyrene as the cavitating material.

The cavitating nature of aromatic polymers such as polyalphamethylstyrene (PAMS) is most surprising and quite unexpected. PAMS was being examined for use as a heat seal additive because of its low molecular weight. Materials with similar molecular weights such as synthetic terpenes are used as the heat seal additive. The synthetic terpenes mix with polypropylene to form heat sealable film with a haze value of 2.0%. The PAMS, however, when mixed with polypropylene produces an opaque film with light transmission values of only 24.6%. Current cavitating materials for white opaque films have molecular weights as high as four times the molecular weight of PAMS.

The use of aromatic polymers such as PAMS as the cavitating agent for an opaque film has several advantages over other known materials. First, the polypropylene and PAMS can be mixed on-line to produce a film of even opacity. Other known materials require masterbatching operations on a twin screw extruder. Second, this film can be made without skin layers. However, one or more skin layers may be applied if desirous or if a particular purpose requires it. Third, the tensile properties of film made with PAMS are superior to the tensile properties of films made with other cavitating agents.

The aromatic polymer is incorporated in effective amounts which are generally in the range of 5 to 25 wt.%, preferably 10-20 wt.%, based on the weight of the resins in the film forming layer. The size and shape of the particles need not be spherical or uniform. The average diameter may vary from about 0.1 to about 10 microns and preferably from about 3-5 microns or 3 microns or less.

The methods for preparing the films described in U.S. Pat. No. 4,377,616 can be used herein. As described therein, the films can contain additional components such as inorganic fillers and the like. Similarly, the films can contain one or more additional layers in order to achieve high gloss, heat sealability or other desired characteristics.

This invention is illustrated by the following non-limiting example in which all parts are by weight unless otherwise specified.

EXAMPLE

Resin blends were prepared by melting the polymeric components, cast extruding the melts and biaxially orienting the films. The films were examined under an optical microscope for particle size and shape of the dispersed phase. The following Table details the resulting light transmission through the films by the type of incompatible polymeric material used.

TABLE

| Material | No. Average $M_n$ Range | Softening Point Range °C. | Light Transmission | Particle Size (Microns) |
|---|---|---|---|---|
| PAMS | 600-960 | 100-140 | 24.6% | 3 |
| Synthetic Terpenes | 700-2500 | 90-150 | 98% | — |
| Polyesters | 10,000 | 225* | 20% | 8-10 |

*Melting point

PAMS and synthetic terpenes are similar materials, yet they yield vastly different light transmission properties. PAMS and the polyesters are very dissimilar materials but they yield similar light transmission properties in the film.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A white opaque biaxially oriented melt extruded film comprising a continuous phase of a first $C_2$–$C_8$ polyolefin polymer and a discontinuous dispersed phase of a finely divided deformable second aromatic polymer incompatible with said first polymer and comprising a polyalphamethylstyrene and dispersed therein in a minor cavitating amount ranging from about 5 to about 25 wt % based on the total weight of the composition.

2. The film of claim 1 wherein said first polymer is polypropylene.

3. The film of claim 1 wherein said second polymer is polyalphamethylstyrene having a average molecular weight 600–900.

4. The film of claim 1 wherein said second polymer is dispersed in said first polymer in an amount ranging from about 10 to about 20 wt.%.

5. The film of claim 1 wherein the second polymer is dispersed within said first polymer in particle sizes having an average diameter ranging from about 0.1 to about 10 microns.

6. The film of claim 5 wherein the average particle size is less than about 8 microns.

7. The film of claim 5 wherein the average particle size is about 3 microns or less.

8. The film of claim 1 having a transparent thermoplastic coating on at least one surface thereof.

9. A blown film in accordance with claim 1.

* * * * *

UNITED STATES PATENT AND TRADEMARK OFFICE
CERTIFICATE OF CORRECTION

PATENT NO. : 4,767,675

DATED : August 30, 1988

INVENTOR(S) : Patricia A. Cyr et al.

It is certified that error appears in the above-identified patent and that said Letters Patent is hereby corrected as shown below:

Cover Sheet    [73] Assignee:
Mobil Oil Corp.
New York, NY

Signed and Sealed this

Fifteenth Day of September, 1992

Attest:

DOUGLAS B. COMER

*Attesting Officer*      *Acting Commissioner of Patents and Trademarks*